United States Patent [19]
Rowe

[11] 3,938,682
[45] Feb. 17, 1976

[54] SELF-LOADING HAY HAULER

[76] Inventor: Carroll Grant Rowe, Rte. 3, Box 236A, Hope, Ark. 71801

[22] Filed: Nov. 13, 1974

[21] Appl. No.: 523,247

[52] U.S. Cl. ............ 214/353; 214/501; 214/DIG. 4
[51] Int. Cl.² .......................................... B60P 1/04
[58] Field of Search.......... 214/501, 506, 523, 77 R, 214/147 G, 766, 768, 144, 130 A, 130 R, 130 C, 350–359, DIG. 4, DIG. 3; 56/341

[56] References Cited
UNITED STATES PATENTS

| | | | |
|---|---|---|---|
| 886,664 | 5/1908 | Talbott | 214/352 |
| 1,276,064 | 8/1918 | Hopkins | 214/144 X |
| 1,678,395 | 7/1928 | Kellems | 214/DIG. 4 |
| 2,716,499 | 8/1955 | Grant | 214/84 |
| 3,877,595 | 4/1975 | Edelman | 214/DIG. 4 |
| 3,880,305 | 4/1975 | Polen | 214/DIG. 4 |

FOREIGN PATENTS OR APPLICATIONS

| | | | |
|---|---|---|---|
| 84,113 | 6/1954 | Norway | 214/353 |

*Primary Examiner*—Albert J. Makay
*Attorney, Agent, or Firm*—Fulbright & Jaworski

[57] ABSTRACT

A device upon which a cylindrical bale of hay or any other appropriate commodity may be loaded and transported including a carrier frame, hitch frame which is pivotally connected to the front of the carrier frame, axle and wheels which are connected to the carrier frame, braking means for the axle and wheels, a fork which is pivotally connected to the carrier frame and is used to pull the bale onto the carrier frame, and a limiting strap which is attached to the carrier and hitch frames for stopping and maintaining the carrier frame in an upright position when the bale of hay has been loaded upon said frame.

17 Claims, 6 Drawing Figures

SELF-LOADING HAY HAULER

BACKGROUND OF THE INVENTION

The need for a self-loading hay hauler which allows cylindrical bales of hay or any other appropriate commodity to be loaded and transported has been recognized by those people who work with such bales. The availability of hay balers such as the Vermeer 650C baler which make cylindrical bales prompted the need. Applicant presently is aware of several patents in the field of art, including United States Pat. Nos. 1,815,825 (Bates, 1931); 2,569,050 (Gref, et al, 1951); 3,401,810 (Grey, 1968); 3,572,521 (Grey, et al, 1971); 3,690,491 (Butler, Jr., 1972); 3,764,031 (Parsen, 1973) and 3,779,208 (Gay, 1973).

SUMMARY OF THE PRESENT INVENTION

The device of the present invention generally provides a hay hauler which may be loaded and transported. The hay hauler is designed to accept cylindrical bales and includes a carrier frame, hitch frame which is pivotally connected to the front of the carrier frame, axle and wheels which are connected to the carrier frame, braking means for the axle and wheels, a fork which is pivotally connected to the carrier frame and is used to pull the bale onto the carrier frame, and a limiting strap which is attached to the carrier and hitch frames for stopping and maintaining the carrier frame in an upright position when the bale of hay has been loaded upon said frame. In addition to loading the bale of hay onto the hay hauler, the basic operations of the device may be reversed to unload the bale once it has been transported to its desired location.

It is, therefore, an object of the present invention to provide a self-loading hay hauler upon which a bale of hay or any other appropriate commodity may be loaded and transported.

Another object of the present invention is the provision of a self-loading hay hauler which may be unloaded by basically reversing the steps incurred in loading the same hauler.

Still other and further objects, features and advantages will be apparent from the following description of a presently preferred embodiment of the invention, given for the purpose of disclosure and taken in conjunction with the accompanying drawings.

BRIEF DESCRIPTION OF THE DRAWINGS

In the drawings forming a part of the disclosure herein, like character references designate like parts throughout the several views, wherein FIG. 6 is a partial top view of the limiting strap.

DESCRIPTION OF THE PREFERRED EMBODIMENT

The present invention provides a hay hauler 10 upon which a bale of hay or any other appropriate commodity 12 may be loaded and transported. Once the bale of hay has been transported to its desired location, it can be unloaded from the hay hauler by reversing the basic steps for loading.

Figure 1:
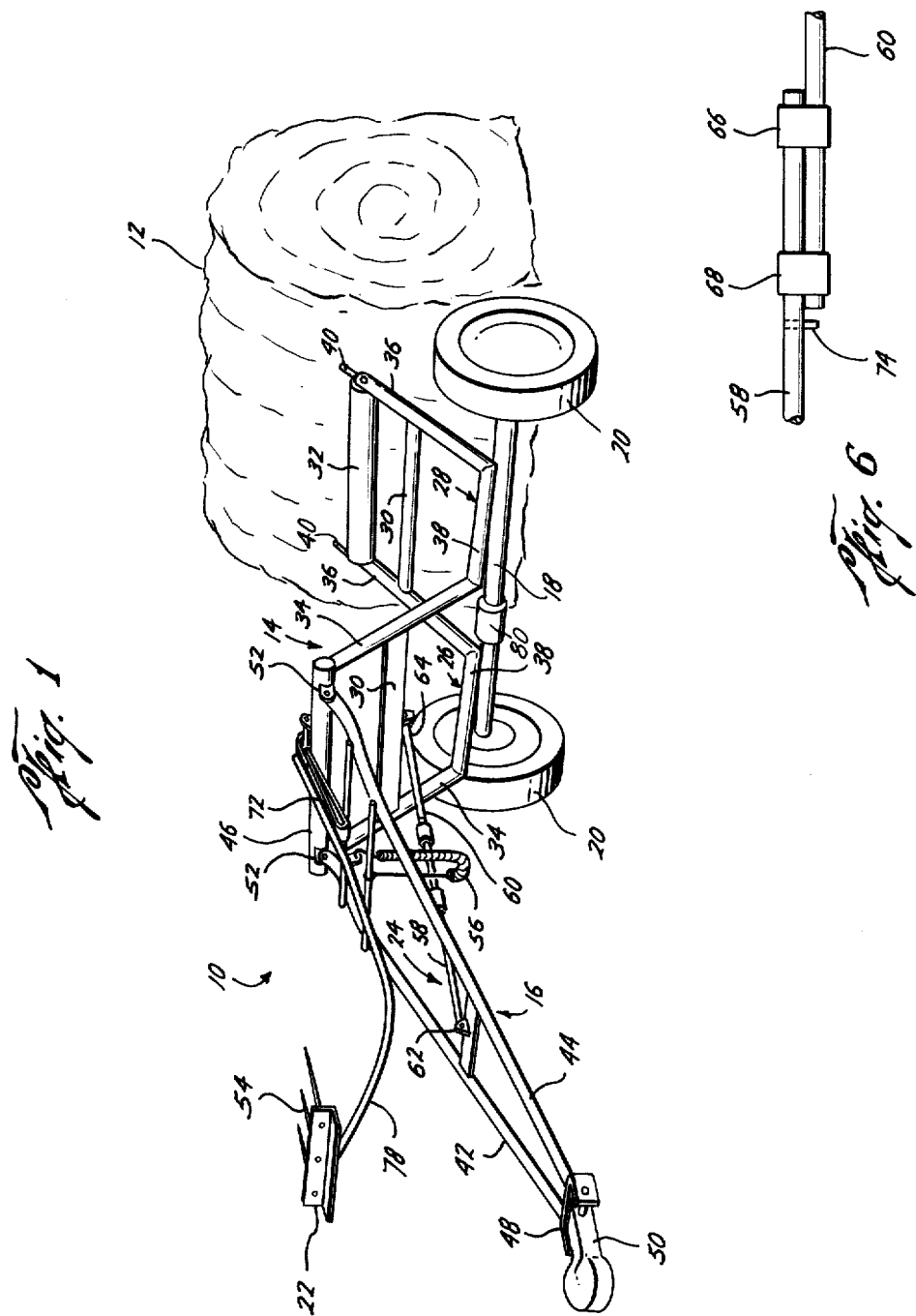
FIG. 1 is a perspective view of the self-loading hay hauler in its transport position.

A perspective view of the preferred embodiment of the hay hauler is shown in FIG. 1. The self-loading hay hauler 10 includes a carrier frame 14, a hitch frame 16 which is pivotally connected to the front of the carrier frame, an axle 18 and wheels 20 which are connected to the carrier frame, braking means 80 for the axle and wheels, a fork 22 which is pivotally connected to the carrier frame and is used for pulling the bale of hay onto the carrier frame 14, and a limiting strap 24 which is attached to the carrier and hitch frames for stopping and maintaining the carrier frame in an upright position when the bale of hay has been loaded upon said frame.

The carrier frame 14 includes two side members 26 and 28 which are located at opposite sides of the carrier frame, one or more horizontal bars 30 for connecting and bracing the two side members, and a roller bar 32 which is connected to the rearward end of the two side members. As shown in FIG. 1, each of the side members 26 and 28 of the carrier frame 14 consists of three segments, two of said segments 34 and 36 being rigidly connected to the third segment 38 at its opposite ends. The third segment of each side member is within a few degrees of a horizontal position when the hay hauler is in its position for transportation. The first and second segments of each side portion, i.e., the forward and rearward segments, 34 and 36 form angles of 140° and 130°, respectively, with the third or "horizontal" segment 38. The brackets 40 upon which the roller bar 32 is connected extend approximately 1.5 inches past the rearward side of said roller bar. Such extensions allow the roller bar 32 to move under the bale and then engage the ground to prevent the bottom of the carrier from rolling forward when the center of the carrier contacts the hay.

The hitch frame 16 of the preferred embodiment includes two side-support members 42 and 44, each of which is pivotally connected to the front horizontal bar 46 of the carrier frame and projects forwardly and inwardly to be interconnected at their intersection 48. A hitch means 50 is pivotally connected to the members 42 and 44 at their intersection 48 for attaching the hay hauler to the truck or other source of transportation. The pivotal connection between each of the side-support members and the front of the carrier frame is in a vertical plane. The two side-support members of the hitch frame are connected to the carrier frame by means of brackets 52 which are positioned in such a manner as to be in a vertical position when the roller bar 32 of the carrier frame and the wheels 20 are both on the ground during the loading process. Said brackets 52 are connected to a horizontal bar 46 which, in turn, is connected to the extreme front end of the carrier frame. Such positioning of the brackets 52 increases leverage for loading.

The present invention includes a fork 22 which is connected to one end of a curved rod 78, while the other end of the rod is pivotally connected to the front horizontal bar 46 of the carrier frame. The curved rod 78 is supported by appropriate means 72 which are welded to the horizontal bar 46 at such an angle as to support the rod until the carrier frame 14 has passed the vertical position in its loading procedure (see FIG. 2). Once the carrier frame has passed the vertical position, the weight of the rod and fork will cause them to fall around the rearward side of the bale of hay 12 which is to be picked up (see FIG. 3).

As shown in FIG. 1, the axle 18 is located beneath the third or "horizontal" segments 38 of the carrier frame 14 and away from hitch frame 14. In fact, the axle and its attached wheels 20 are located in a position which allows the wheels 20 to make contact with the ground after the bale has been rolled forward so that the center of gravity of the bale is slightly ahead of the roller bar 32. The resulting pivoting action of the axle 18 as the wheels 20 touch the ground lifts the bale on the carrier frame 14. With the axle located thusly, the weight of the bale increases the traction of the vehicle to which the hay hauler 10 is attached. The increased leverage lessens the power required to load the bale onto the carrier.

Figure 4:
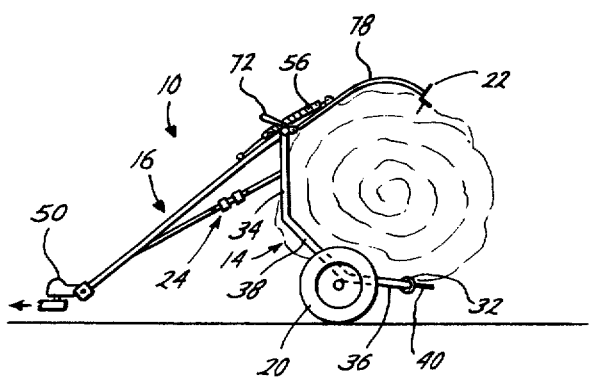
FIG. 4 is a side elevational view of the self-loading hay hauler in the process of depositing the hay on the hauler.
Figure 5:
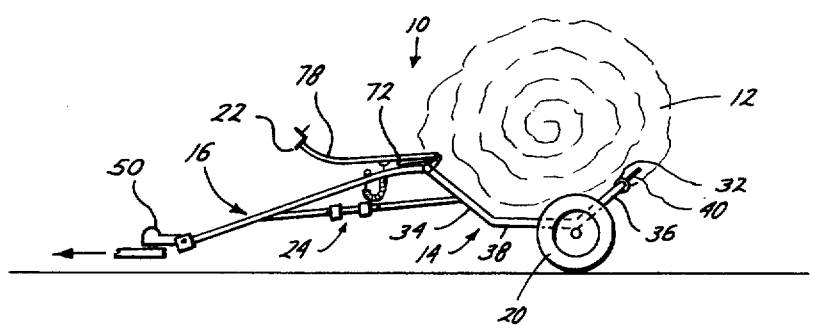
FIG. 5 is a side elevational view of the self-loading hay hauler in its transport position with the hay loaded thereon.

When the hay hauler 10 is pulled forward into its upright position, the tines 54 of the fork 22 will sink into the bale and roll it forward on the carrier frame 14 (see FIG. 4). As the hay hauler approaches its transport position, the bale of hay will settle onto the carrier frame. At such time, the bale's downward movement into the carrier frame will separate the tines from the bale of hay. Then, as the hitch frame extends forward, a spring loaded line 56 between the hitch frame and the fork forces the latter back to its original position, i.e., resting upon the carrier and hitch frames (see FIG. 5). The spring device provides an added safeguard if the bale of hay should not be fully settled on the carrier frame when the hitch frame is extended.

The present invention also includes a limiting strap 24 which is attached to the hitch and carrier frames 16 and 14, the purpose of such strap being to stop the carrier frame in an upright position when the bale 12 has been loaded upon said frame. The limiting strap includes two sections, 58 and 60, one end 62 of the first section 58 being connected to the hitch frame while one end 64 of the second section 60 is connected to the carrier frame; two blocking mechanisms 66 and 68, being located on the free end of each of the two sections 58 and 60, respectively, and interconnecting said sections at such respective ends 58 and 60; and appropriate means for locking the two segments in place during transportation of the device (see FIG. 6). In the preferred embodiment, the locking means consists of a locking pin 74 which is located on the first segment 58. When the locking pin is engaged, blocking mechanism 68 is prohibited from moving along the first segment 58 by the locking pin 74 and the other blocking mechanism 66. The use of the locking pin prevents accidental dumpings which might result from sudden stops when transporting the bale of hay from one location to another.

Figure 2:
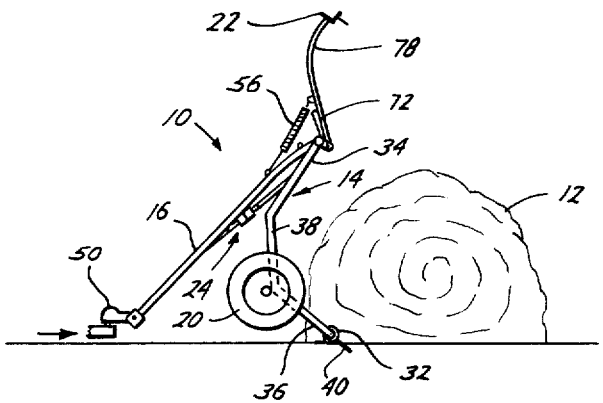
FIG. 2 is a side elevational view of the self-loading hay hauler in its vertical position.
Figure 3:
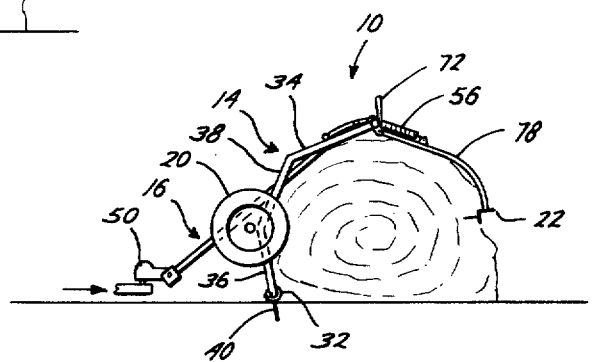
FIG. 3 is a side elevational view of the self-loading hay hauler with its fork encircling the bale of hay.

In summation, the present invention consists of a self-loading hay hauler. The hay hauler may be used with any automotive type of conveyance, including a car, truck or tractor. The hay hauler is attached to such automotive device by hitch means and needs no auxiliary power source to load the hay. In operation, the hay hauler 10 is backed up to a bale of hay 12, and, upon contact with the roller bar 32, the backward force being exerted by the towing vehicle raises the front part of the hay hauler's carrier frame 14 while lowering its rear portion until the roller bar is in contact with the ground. Backing the towing vehicle further forces the roller bar snugly under the side of the bale and forces the front of the carrier frame over the top of the bale as shown in FIG. 2. As the hay hauler passes a vertical position, the fork 22 which is attached to the front of the carrier frame will fall around the rearward side of the bale of hay. The automotive vehicle is then driven forward and the resulting forward motion of the hay hauler causes the tines 54 of the fork to sink into the bale of hay and roll it forward on the roller bar. Upon contact of the wheels 20 with the ground, the bale of hay is already upon the roller bar and, with the brakes of the wheels applied to prevent rolling, the carrier frame is pivoted forward. As a result of such movement, the bale of hay settles onto the carrier frame. The downward movement of the bale of hay as it settles removes the fork's tines from the bale. The fork is then pulled back to its original position as previously described.

The limiting strap 24, which is attached to the carrier and hitch frames 14 and 16, stops the carrier frame at the transport position and, then, is locked into place by means of the locking pin 74. To unload the bale of hay, the above-mentioned process is reversed with the exception that the carrier frame is not backed past its vertical position which prevents the fork from falling around the bale of hay as it is deposited from the carrier frame. Of course, the braking system 80 for the axle and wheels of the hay hauler will have to be activated.

While any acceptable form of braking system might be applied to the wheels of the invention, it should be noted that the preferred embodiment includes an electrical braking system.

The present invention, therefore, is well adapted to carry out the objects and attain the ends and advantages mentioned as well as others therein. While a presently preferred embodiment of the invention has been given for the purpose of disclosure, numerous changes may be made without departing from the spirit and scope of the invention as hereinafter claimed.

What is claimed is:

1. A device upon which a bale of hay or any other appropriate commodity may be loaded and transported by a towing vehicle, including
   a carrier frame upon which the bale rests when it has been loaded, said carrier frame including two side members, each consisting of at least one segment, at least one horizontal bar for connecting and bracing the two side members,
   a hitch frame, one end of which is pivotally connected to the carrier frame, while the other end may be connected to the towing vehicle,
   an axle and wheels secured to the carrier frame,
   braking means for the axle and wheels,
   a fork pivotally connected to the carrier frame for pulling the bale onto the carrier frame, said fork falling over and grasping the bale as the device is positioned to pick up the bale, and
   a roller bar connected to the rearward end of the two side members, said roller bar providing a point of rotation for the carrier frame when the roller bar contacts the ground for loading the bale onto the carrier frame.

2. The invention of claim 1 wherein the roller bar is mounted upon brackets which extend outwardly beyond said bar to penetrate the ground as the device assuming its loading position to prevent undesirable movement of the carrier frame during loading.

3. The invention of claim 1 wherein the hitch frame includes
    at least one support member pivotally connected to the front of the carrier frame and projecting forwardly, and downwardly from its intersection with the carrier frame, and
    hitch means pivotally connected to the support member for attachment to a towing vehicle.

4. The invention of claim 1 wherein the hitch frame includes
    two side-support members, each pivotally connected to the carrier frame and projecting forwardly, inwardly, and downwardly from its intersection with the carrier frame, said members intersecting and being interconnected at their intersection, and
    hitch means pivotally connected to the two side-support members for attachment to a towing vehicle.

5. The invention of claim 1 wherein the braking means for the axle and wheels is operated electrically.

6. The invention of claim 1 wherein a spring-loaded line, located between the hitch frame and fork, forces the fork back to a position upon the carrier and hitch frames after the bale is loaded, the spring being loaded as the fork falls over and grasps the bale, the spring pulling the fork to said position after the bale settles in the carrier frame and disengages the fork.

7. The invention of claim 1 including a limiting strap which is attached to the hitch frame and carrier frame, stops the carrier frame in an upright position when the bale has been loaded upon said carrier frame, and includes
    two sections, one end of the first section being connected to the hitch frame while one end of the second section is connected to the carrier frame, the other end of each section being free of either frame,
    two blocking mechanisms interconnecting the two sections, one located on the free end of the section connected to the hitch frame and the other located on the free end of the other section, and
    appropriate means for locking the two sections in place during transportation of the device.

8. The invention of claim 7 wherein the locking means is a locking pin located on the section of limiting strap which is connected to the hitch frame.

9. The invention of claim 1 wherein the fork is automatically forced back to its original position after the bale has settled upon the carrier frame, said force being applied by a spring-loaded line connected between the hitch frame and the fork, the spring being loaded as the fork falls over and grasps the bale, the spring pulling the fork to said position after the bale settles in the carrier frame and disengages the fork.

10. A device upon which a bale of hay or any other appropriate commodity may be loaded and transported by a towing vehicle, including
    a carrier frame which consists of two side members, each consisting of three segments, two of which are rigidly connected to the third; at least one horizontal bar for connecting and bracing the two side portions; and a roller bar connected to the rearward end of the two side portions,
    a hitch frame assembly at least one support member pivotally connected to the front of the carrier frame and projecting forwardly and hitch means pivotally connected to the support member for attachment to a towing vehicle,
    an axle and wheels secured to the carrier frame, braking means for the axle and wheels,
    a limiting strap which is attached to the hitch frame and carrier frame, stops the carrier frame in an upright position when the bale has been loaded upon said carrier frame, and includes two sections, one end of the first section being connected to the hitch frame while one end of the second section is connected to the carrier frame, the other end of each section being free of either frame; two blocking mechanisms interconnecting the two sections, one located on the free end of the section connected to the hitch frame and the other located on the free end of the other section; and appropriate means for locking the two sections in place during transportation of the device, and
    a fork is pivotally connected to the carrier frame for pulling the bale onto the carrier frame and is automatically forced back to its original position after the bale has settled upon the carrier frame, said force being applied by a spring-loaded line connected between the hitch frame and the fork, the spring being loaded as the fork falls over and grasps the bale, the spring pulling the fork to said position after the bale settles in the carrier frame and disengages the fork.

11. The invention of claim 10 wherein the braking means for the axle and wheels is operated electrically.

12. The invention of claim 10 wherein the locking means is a locking pin located on the segment of the limiting strap which is connected to the hitch frame.

13. The invention of claim 10 wherein the side-support members are connected to the carrier frame by means of brackets which are located on the carrier frame and are in a vertical position when the roller bar and the wheels are on the ground simultaneously.

14. A device upon which a bale of hay or any other appropriate commodity may be loaded and transported by a towing vehicle, including
    a carrier frame which consists of two side members, each consisting of three segments, two of which are rigidly connected to the third; at least one horizontal bar for connecting and bracing the two side portions; and a roller bar connected to the rearward end of the two side portions,
    a hitch frame including two side-support members, each pivotally connected to the carrier frame and projecting forwardly and inwardly, being interconnected at their intersection; and hitch means pivotally connected to the two side-support members for attachment to a towing vehicle,
    an axle and wheels secured to the carrier frame, braking means for the axle and wheels,
    a limiting strap which is attached to the hitch frame and carrier frame, stops the carrier frame in an upright position when the bale has been loaded upon said carrier frame, and includes two sections, one end of the first section being connected to the hitch frame while one end of the second section is connected to the carrier frame, the other end of each section being free of either frame; two blocking mechanisms interconnecting the two sections, one located on the free end of the section connected to the hitch frame and the other located on the free end of the other section; and appropriate means for locking the two sections in place during transportation of the device, and a fork which is pivotally connected to the carrier frame for pulling the bale onto the carrier frame and is automatically forced back to its original position after the bale has settled upon the carrier frame, said force being applied by a spring-loaded line connected between the hitch frame and the fork, the spring being loaded as the fork falls over and grasps the bale, the spring pulling the fork to said position after the bale settles in the carrier frame and disengages the fork.

15. The invention of claim 14 wherein the braking means for the axle and wheels is operated electrically.

16. The invention of claim 14 wherein the locking means is a locking pin located on the segment of the limiting strap which is connected to the hitch frame.

17. The invention of claim 14 wherein the side-support members are connected to the carrier frame by means of brackets which are located on the carrier frame and are in a vertical position when the roller bar and the wheels are on the ground simultaneously.

* * * * *